United States Patent [19]

Cornish

[11] 4,231,457
[45] Nov. 4, 1980

[54] THERMOSTATICALLY CONTROLLED FAN CLUTCH

[75] Inventor: Robert N. Cornish, Huddersfield, England

[73] Assignee: Holset Engineering Company Limited, Huddersfield, England

[21] Appl. No.: 883,567

[22] Filed: Mar. 6, 1978

[30] Foreign Application Priority Data

Mar. 7, 1977 [GB] United Kingdom ................ 9453/77

[51] Int. Cl.³ ..................... F16D 43/25; F16D 25/06; F16D 13/74
[52] U.S. Cl. ........................... 192/82 T; 192/85 AA; 192/113 B
[58] Field of Search ........... 192/85 AA, 113 B, 85 A, 192/85 R, 82 T

[56] References Cited

U.S. PATENT DOCUMENTS

| | | | |
|---|---|---|---|
| 2,178,017 | 10/1939 | Fedden et al. | 192/85 AA |
| 2,927,563 | 3/1960 | Geiger | 192/85 AA |
| 3,162,063 | 12/1964 | Konrad | 192/85 AA |
| 3,202,253 | 8/1965 | Merritt et al. | 192/85 AA |
| 3,217,851 | 11/1965 | Mogk et al. | 192/85 AA |
| 3,237,404 | 3/1966 | Flanigan et al. | 192/85 AA |
| 3,301,142 | 1/1967 | Cenko | 192/85 AA |
| 4,074,663 | 2/1978 | Cory | 192/113 B |
| 4,094,393 | 6/1978 | Spokas | 192/85 AA |

FOREIGN PATENT DOCUMENTS

1303654 8/1962 France ................................ 192/85 AA

*Primary Examiner*—George H. Krizmanich
*Attorney, Agent, or Firm*—Gary M. Gron; Robert T. Ruff

[57] ABSTRACT

A thermostatically controlled fan clutch having input and output members journalled about a fixed support shaft. A series of clutch plates are alternately connected to the input and output members. An annular piston housing and piston rotate with the input member and are pressurized to engage the clutches. A bore extends through the piston and connects with an annular groove on its contact face to control clutch engagement and assist in disengagement.

11 Claims, 3 Drawing Figures

THERMOSTATICALLY CONTROLLED FAN CLUTCH

The present invention relates to clutch assemblies and in particular to thermostatically controlled clutch assemblies which are adapted to connect an input member to an output member above or below a predetermined temperature. This clutch is particularly suited for rotating a cooling fan of an internal combustion engine.

Many different types of cooling fan clutch assemblies have been proposed for internal combustion engines to increase efficiency. These clutches couple the cooling fan to an engine driven shaft or pulley only when temperature conditions require increased air flow past the engine radiator. This is done to minimize the parasitic power losses and resultant decrease in efficiency associated with driving the fan. In addition, these clutches tend to reduce the average engine sound level since a driven fan is one of the biggest contributors to noise.

One type of fan clutch is known as a viscous fluid air sensing fan clutch, exemplified by U.S. Pat. No. 3,179,221. This clutch offers the advantages of being self contained, relatively simple and responding directly to the air temperature passing through the engine radiator. It has the disadvantage of always providing some form of fan engagement which reduces the potential efficiency gains available with fan clutches. Another disadvantage is that of limited torque carrying capability without an excessive increase in size for the clutch assembly.

Another type of clutch utilizes a series of oil lubricated clutch plates, which are engageable with one another in response to a temperature condition to drive a cooling fan. An example may be found in U.S. Pat. No. 3,848,622. These fan clutches offer high torque carrying capability and minimal fan speed in the off position. However, they are very complicated which makes for increased manufacturing expense and more difficult servicing.

In accordance with the present invention, there is provided a thermostatically controlled clutch assembly comprising a non-rotatable support shaft, an annular output member journalled for rotation about said support shaft, an annular input member journalled for rotation about said support shaft and said output member, an annular piston housing having an annular groove in one face thereof receiving an annular actuating piston. The assembly is journalled for rotation about said support shaft and connected for rotation with said input member. Clutch driving plates are connected for rotation with the piston housing and actuating piston assembly and clutch driven plates are connected for rotation with said output member. First passage means within the support shaft conduct pressurized fluid from an external source to the piston housing and actuating piston assembly. Second passage means within the support shaft conduct a supply of cooling and lubricating fluid from said external source to the clutch driving and driven plates. Means are provided for commonly draining both the actuating fluid and the cooling and lubricating fluid from the clutch assembly for return to the external source.

Preferably, there is also provided a control valve having an associated temperature sensing element arranged to open the valve to admit pressurized fluid to said first passage means at and above a predetermined temperature ambient to the sensing element whereby to actuate the clutch and establish a driving connection between the input and output members and to close the valve when the temperature ambient to the sensing element is below said predetermined temperature to deactuate the clutch. In all cases, a supply of pressurized fluid is arranged to be continuously coupled to said second passage means for supplying said cooling and lubricating fluid.

The invention is described further hereinafter, by way of example, with reference to the accompanying drawings, in which.

Figure 1:
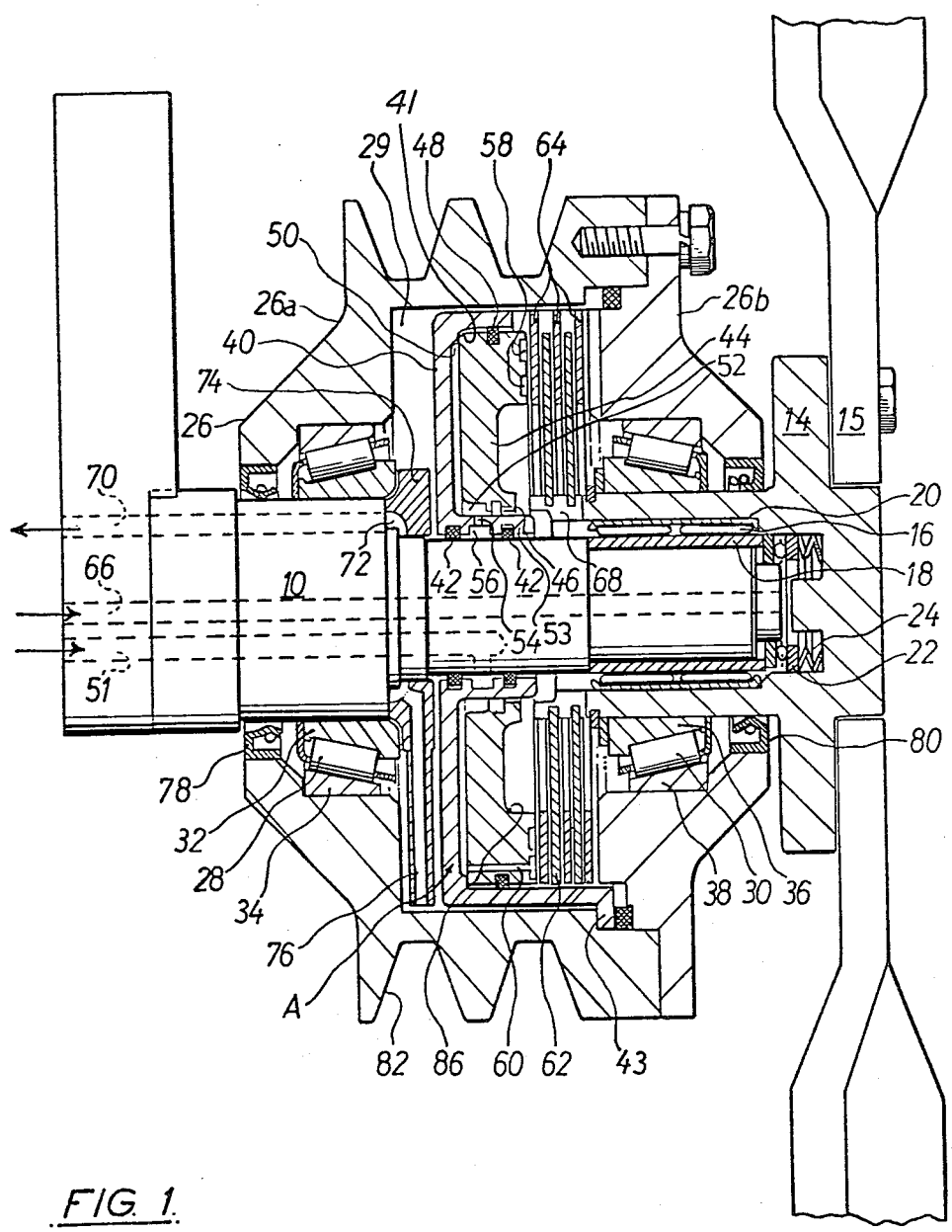
FIG. 1 is a partially sectioned side elevation of a first embodiment of a clutch assembly in accordance with the invention.

The first embodiment, illustrated in FIG. 1, comprises a support shaft 10 which is adapted to be nonrotatably mounted on a fixed base for supporting the clutch assembly in its operating position. Rotatably mounted on the free end of the support shaft 10 is a generally annular output member 14 adapted to carry a driven element, such as an engine cooling fan 15 (not fully shown). The output member 14 is journalled on the support member 10 by means of a needle or roller bearing unit 16 which includes cylindrical inner and outer race members 18, 20 carried by the support and output members 10, 14 respectively, and by means of a thrust bearing 22 and Belleville washer arrangement 24. A generally annular input or driving member 26 is journalled on the support member 10 by a roller bearing 28 and on the output member 14 by a roller bearing 30. The bearing 28 includes inner and outer annular race members 32, 34 carried by the support member 10 and input member 26, respectively. The bearing 30 includes inner and outer annular race members 36, 38 carried by the output member 14 and input member 26, respectively.

The input member 26 is formed by two parts 26a, 26b held together by screws 27 so as to define an annular chamber 29 between its inner periphery and a portion of the support shaft 10. Located within the latter chamber 29 is a generally annular piston housing 40 whose outer periphery is rigidly keyed to the input member 26 as at 43 so that the piston housing 40 rotates with the input member. The inner periphery of the piston housing 40 is journalled on the support shaft 10 by means of a pair of rotating ring seals 42. Piston housing 40 has an annular groove 41 in one face which slidingly receives an annular piston 44 having radially inner and outer sealing rings 46, 48. A narrow annular fluid chamber 50 is formed between the rear face of the piston 44 and the walls of groove 41.

The chamber 50 communicates with a fluid inlet bore 51 in the fixed support shaft 10 via an annular groove 52 in the base of the piston 44, one or more generally radially directed apertures 54 in the inner peripheral wall of the piston housing 40 and an annular groove 56 in its inner diameter. The front wall of the piston 44 contains one or more annular grooves 58 connected to the chamber 50 through the rear wall of the piston, via one or more axially directed bores 60.

Located between the input member 26 and the output member 14 is a clutch assembly comprising one or more clutch plates 62 whose radially inner ends are rigidly keyed to the output member 14 and one or more annular clutch plates 64 whose radially outer ends are rigidly keyed to the cylinder 40, and hence to the input member 26. Thus, displacement of the piston 44 to the right as viewed in FIG. 1 by the introduction of pressurized fluid to the chamber 50 via the bore 51 causes the sets of clutch plates 62 and 64 to be clamped together whereby the output member 14 rotates with the input member 26.

The fixed support shaft 10 further includes an axially directed through-bore through which cooling and lubricating fluid can be introduced and which then flows through the thrust bearing 22, through the needle bearing 16 and radially outwardly across the clutch plates 62, 64 via slots 68 in the output member 14. The cooling and lubricating fluid can, of course, also reach the roller bearings 28, 30.

A third axial bore 70 in the fixed support shaft 10 communicates with an annular passage 72 formed between a shoulder on the support shaft and a clamping plate 74 which holds the bearing 28 in position. The passage 72 communicates in turn with the radially inner end of an elongate scoop member 76 which is rigidly fixed to the support shaft. The radially outer, input end of the scoop is located adjacent the inner periphery of the input member 26 for exhausting used fluid which collects in this region as a result of the centrifugal forces generated by the various rotating parts.

Rotary seals 78, 80 prevent the leakage of fluid from between the input member 26 and support shaft 10, and between the input member 26 and output member 14, respectively.

Figure 3:
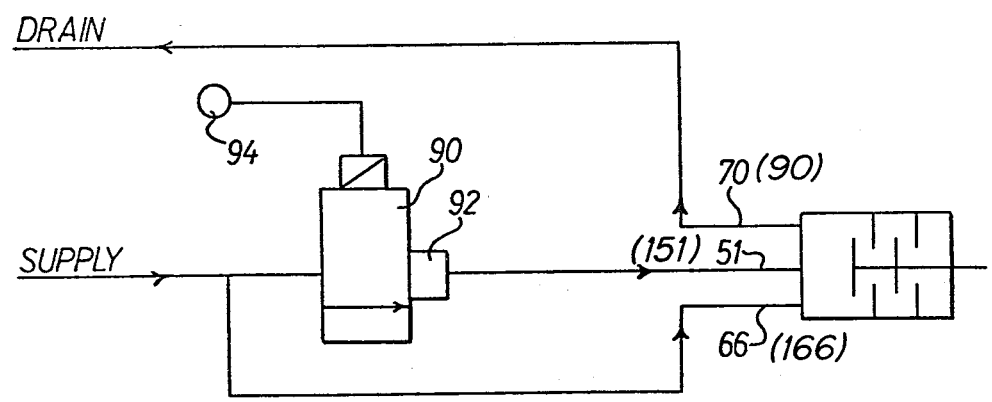
FIG. 3 is a schematic circuit of one embodiment of an oil supply system for the clutch assembly of FIG. 1 or FIG. 2.

As indicated diagrammatically in FIG. 3, the bore 51 is connected to a source of pressurized fluid via a solenoid operated valve 90 and restrictor 92. The solenoid valve is operated by a temperature sensitive switch means 94 arranged to open the valve when the temperature ambient to the temperature sensitive switch is above a predetermined value to admit pressurized oil to bore 51. The valve is closed thus cutting off the supply of pressurized fluid from the bore 51 when the temperature ambient to the temperature sensitive switch falls below the predetermined value. The bore 66 is connected to a point upstream of the valve 90 so as to be permanently connected to the pressurized fluid supply. The bore 70 is connected to drain.

During operation of the clutch assembly, the input member 26 is rotated relative to the support shaft 10 by means of an input drive means. In the illustrated embodiment, the drive means would be an engine driven belt (not shown) engaging peripheral grooves 82 in the input member 26. Alternatively, the input drive could be in the form of an engine driven gear train, although this latter arrangement is more applicable to the second embodiment described below.

During operation of the assembly, pressurized fluid is continuously supplied to the bore 66 to cool and lubricate the bearings 22, 18, 28 and 30, the ring seals 42 and the clutch plates 62, 64. This fluid is continuously exhausted back to a reservoir via the scoop 76 and the bore 70.

When no pressurized fluid is supplied to the bore 51, the piston 44 adopts the position illustrated in which its front face is clear of the left most clutch plate 64 so that the clutch plates 64 are able to rotate relative to the clutch plates 62. In this condition, with the exception of a minimum inherent drag torque caused by the presence of cooling oil between the clutch plates, the clutch is substantially disengaged and the output member 14 rotates at a minimum speed.

At a predetermined temperature, the valve 90 is arranged to be actuated to introduce pressurized fluid, preferably oil, into the bore 51 and then into the chamber 50 whereby the piston 44 is displaced to the right to clamp the clutch plates 62, 64 together and cause the output member 14 to rotate with the input member 26. To avoid too rapid engagement of the clutch, the bore 60 acts to delay pressure build-up within the chamber 50.

The piston 44 engages the cylinder portion 40 only at its inner and outer surfaces and these two parts rotate together. Therefore, when pressure is applied in the chamber 50, the seals 46 and 48 are easily able to seal the adjoining surfaces.

When the temperature falls to a second predetermined value, the valve 90 is arranged to cut-off the supply of pressurized fluid to the bore 51 and either simply block the latter bore or connect it to an exhaust line back to the fluid reservoir. The fluid behind the piston 44 can then leak away, principally via the bore 60, through the clutch plates 62, 64, around the cylinder 40 and out through the scoop 76. It is then returned to the reservoir via the bore 70 along with other fluid from bore 66 which was originally supplied for cooling and lubricating purposes. Return of the piston to its original position, i.e. to the left as viewed in the drawing, is assisted by the resultant force exerted on the piston by the oil which is being urged by centrifugal force against the curved surface of a recessed portion 86 of the front face of the piston 44. The provision of the annular groove or grooves 58 serves to assist the parting of the front face of the piston 44 from the adjacent left most clutch plate 64 which would otherwise tend to stick together and prevent proper withdrawal of the piston.

The valve 90 can take many forms. For example, it can be a simple solenoid operated on-off valve in a line connecting the bore 51 to a continuously operating source of pressurized fluid, such as the conventional oil pump in an internal combustion engine. In this event, the valve can be arranged to be actuated by an electrical signal produced upon the first predetermined temperature being detected by a suitable thermostatically controlled sensor. The bore 66 is, of course, continuously connected to the oil pump to insure at all times a flow of lubricant past the bearings and clutch plates.

Figure 2:
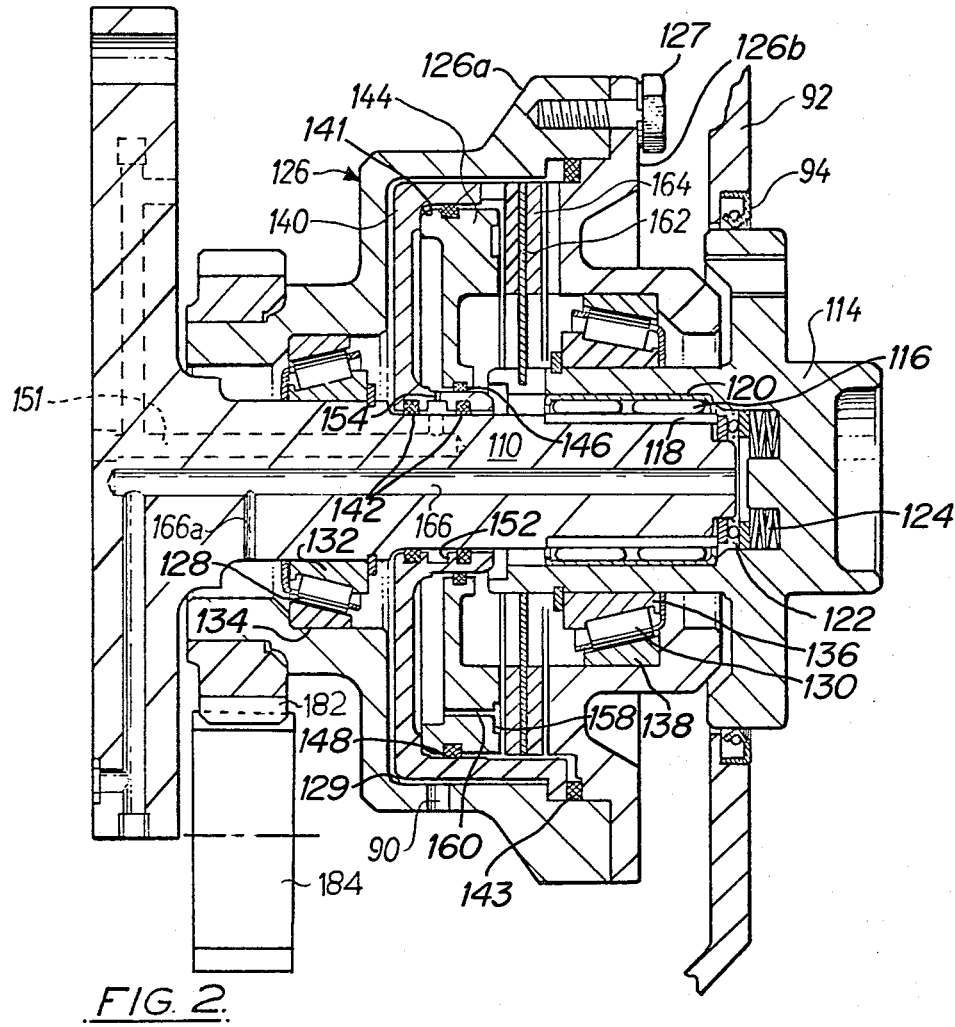
FIG. 2 is a sectional side elevation of a second embodiment of a clutch assembly in accordance with the invention.

The embodiment of FIG. 2 is very similar to that of FIG. 1 and directly equivalent parts are indicated by the same reference numerals plus one hundred. The principal difference between the two embodiments is that the second is designed to operate inside an engine housing, i.e. in open communication with the crank case, whereas the first embodiment is intended to operate externally of the engine. The second embodiment is therefore somewhat simpler since the need for the scoop and the third bore 70 of the first embodiment is no longer present, the used fluid being allowed to drain back to the reservoir or sump simply by means of one or more drain holes to be described below.

The support member 110 is non rotatably mounted with the engine housing by suitable apparatus (not shown). The output member 114 is journaled about the support member 110 by the roller bearing unit 116 having inner and outer races 118 and 120, respectively. The generally annular input member 126 is comprised of parts 126a and 126b, held together by screws 127 (only one of which is shown) to form the chamber 129. Input member 126 is journaled about the support member 110 by a roller bearing 128 having inner and outer races 132, 134 respectively. The input member 126 is journaled about the output member 114 by a roller bearing 136 which has an inner race 136 and outer race 138.

The annular piston housing 140 is positioned within chamber 129 and is rigidly keyed to the input member 126 between parts 126a and 126b at 43. The inner perifery of the piston housing 140 is journaled over the support shaft 110 by means of a pair of rotatable ring seals 142. The piston housing 140 has the annular groove 141 in one face to receive the annular piston 144 having the inner and outer sealing rings 146, 148 respectively. The annular fluid chamber 150, formed between piston 144 and the walls of groove 141, communicates with the fluid inlet bore 151 in the support shaft 110 through the inner groove 153 and radial apertures 154 in the piston 144. The front face of piston 144 has a single angular groove 158 which connects with chamber 150 by passage 160.

The clutch assembly containing at least one clutch plate 162 is positioned between the input member 126 and output member 114. The inner end of the clutch plate 162 is keyed to the output member 114. Clutch plates 164 are keyed to the annular piston housing 140 and hence to the input member 126.

As shown diagrammatically in FIG. 2, the output member 114 is passed through an opening in the engine housing 92, with a suitable rotary seal 94 therebetween. As in the first embodiment, cooling and lubricating oil for the various bearings and for the clutch plates 162, 164 (fewer plates being shown in FIG. 2 for convenience) is supplied continuously via the bore 166 in the fixed support shaft 110. Likewise, for actuating the piston and piston housing assembly 140, 144, pressurized fluid can be selectively supplied by the valve (not shown) to the bore 151 to displace piston 144 to clamp the clutch plates 162, 164 together to connect the output to the input members. The fluid is derived from the system shown in FIG. 3 in response to temperature variations applied to temperature responsive switch means 94. Lubricating fluid is also arranged to be introduced via an additional bore 166a, connected to the bore 166. The fluid from both the bores 166 and 151 is exhausted via the hole or holes 90 in the input member and simply allowed to drain back to the reservoir. Fluid can also drain out of the unsealed left hand space between the support shaft and the input member and through the right hand space between the output member and the input member.

Unlike in the embodiment of FIG. 1 which is adapted to be belt driven, the input member 126 of the second embodiment has a toothed pinion 182 rigidly fixed to its external periphery for engagement with a suitable gear 184, driven, for example, by the engine.

Both of the aforegoing embodiments have the advantage that they are supplied with actuating fluid and fluid for cooling and lubricating from a common fluid source, which can advantageously be a conventional oil pump when the clutch assembly is used in, or in conjunction with, an internal combustion engine.

In the embodiments described below, when the supply of pressurized fluid is cut-off, the piston 44 is moved to the left and is disengaged from the clutch principally by means of the resultant force exerted on the piston by the oil which is urged by centrifugal force against the piston surface 86. In other embodiments the disengagement may be arranged to be spring assisted. For example, such spring assistance can be achieved by the provision of a spring of the circular Belleville type or of the corrugated washer type disposed between the face of the piston 44 containing the grooves 58 and the adjacent clutch plate pack. Such a spring is arranged to be of limited axial movement so as to exert no significant axial pressure when the clutch plates are disengaged.

Advantageously the clutches described above have an input member formed in two separate parts and the cylinder and piston assembly comprises an annular piston slidably located in an annular cylinder which is fixed to one end of the input members and rotatable on the non-rotatable support shaft. When the screws 27 are released, the assembly comprising the input member part 26b, the cylinder 40, the piston 44, the driven and driving clutch plates 62, 64, the bearing 30 and the output member 14 can be withdrawn from the support shaft 10 as a unit. By virtue of this arrangement, the cylinder and piston assembly, the clutch driving and driven plates, the output member and one part of the input member can be constructed as a replaceable unit which can be applied to a wide variety of assemblies comprising the support shaft and the other input member part.

There are no retainers or snap rings preventing removal and replacement of the unit. The piston is slidable in relation to the cylinder and the clutch driving plates to effect actuation of the clutch. However, the parts all rotate together and the piston is supported by the cylinder. Pressure is applied between the cylinder and the piston to actuate the clutch but since the parts rotate together, effective seals are readily provided between the cylinder and the piston. This arrangement contrasts with prior art constructions where both parts rotate and slide relative to each other.

Although a preferred embodiment of the present invention has been described, iy should be apparent to those skilled in the art that other forms may be employed without departing from its spirit and scope.

Having thus described the invention what is claimed as novel and desired to be secured by letters patent of the United States is:

1. A thermostatically controlled clutch assembly comprising a non-rotatable support shaft, an annular output member journaled for rotation about said support shaft, an annular input member journaled for rotation about said shaft and said output member, one of said members defining an annular chamber, an annular piston housing having an annular groove in one face thereof, said piston housing being positioned within said annular chamber and journaled for rotation about said support shaft and connected for rotation with said input member, an annular piston received in said groove, clutch driving plates connected for rotation with said output member means defining a first passage within the support shaft for conducting pressurized fluid from an external source to the annular piston housing and piston assembly means for defining a second passage within the support shaft for conducting a supply of cooling and lubricating fluid from said external source to the clutch driving and driven plates, and means for commonly draining both the actuating fluid and the cooling and lubricating fluid from the clutch assembly for return to the external source, a control valve and a temperature sending element arranged to open the valve to admit pressurized fluid to said first passage means at and above a predetermined temperature ambient to said sending element whereby to actuate the clutch and establish a driving connection between the input and output members and to close the valve when the temperature ambient to the sensing element is below said predetermined temperature to deactuate the clutch.

2. Apparatus as claimed in claim 1 in which the front and rear faces of the piston are connected by at least one through bore providing a leakage passage through the piston.

3. Apparatus as claimed in claim 2 in which said front face of the piston contains one or more annular grooves communicating with the or each said through bore for facilitating disengagement of the piston from said one clutch driving plate during deactuation of the clutch.

4. Apparatus as claimed in claim 3 in which the front face of the piston is arranged to engage directly one of said clutch driving plates when the clutch is actuated.

5. Apparatus as claimed in claim 4 in which a spring means is disposed between the front face of the piston and an adjacent one of said clutch driving plates, for assisting disengagement of the piston from the clutch upon deactuation.

6. Apparatus as claimed in claim 5 in which said spring means comprises a circular Belleville type spring.

7. Apparatus as claimed in claim 1 in which the first passage means communicates with the actuating chamber between the piston and piston housing by way of an annular groove and one or more radially directed bores in an axially extending flange portion of the piston housing located at the radially inner periphery thereof and by way of an adjacent annular groove in the radially inner periphery of the piston.

8. Apparatus as claimed in claim 1 in which the second passage means communicates with the clutch plates by way of bearing means journaled the output member on the support shaft and by way of radially directed slots in the output member positioned adjacent the radially inner ends of said clutch driven plates.

9. Apparatus as in claim 1 in combination with an internal combustion engine casing wherein said support shaft and input member are positioned within said casing, said output member projecting from said casing and wherein said input member has at least one hole in the peripheral wall of said input member for connecting said annular chamber to the interior of said casing, thereby forming at least in part said common draining means.

10. Apparatus as claimed in claim 1 in which said common drain means comprises a scoop member rigidly fixed relative to the support shaft and extending into the region of the internal peripheral wall of the input member where, in use, fluid in said annular chamber collects under the effect of centrifugal force, the radially inner end of the scoop communicating with a third passage means extending through the non-rotatable support shaft.

11. Apparatus as claimed in claim 1 further comprising a cooling fan carried by the output member.

* * * * *